Dec. 20, 1960  J. J. OROS  2,965,131
VALVE STRUCTURE AND LINKAGE THEREFOR
Filed June 20, 1958  2 Sheets-Sheet 2
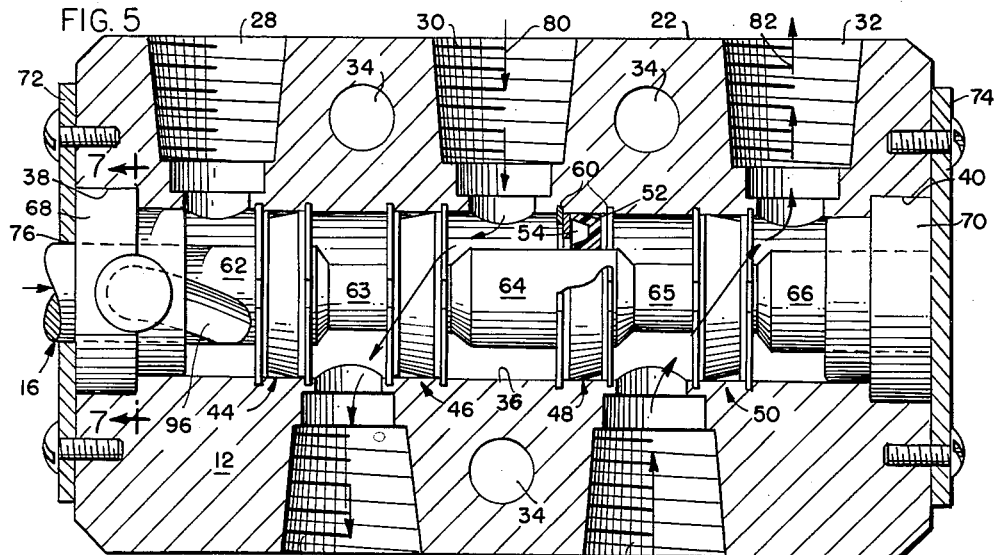
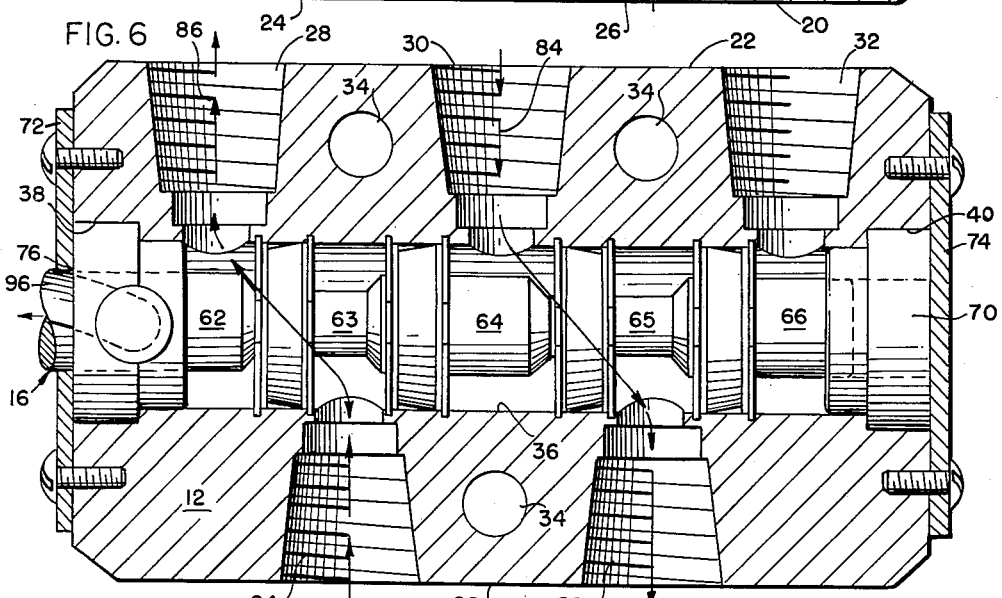
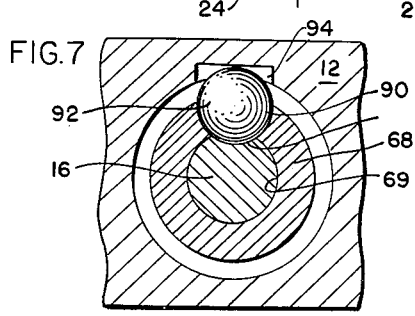
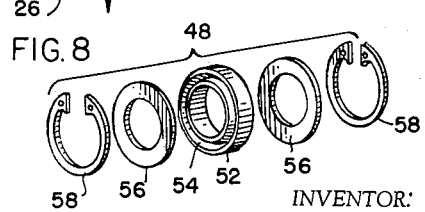
INVENTOR:
JOHN J. OROS
BY
Silverson, Mullin & Cass
ATT'YS

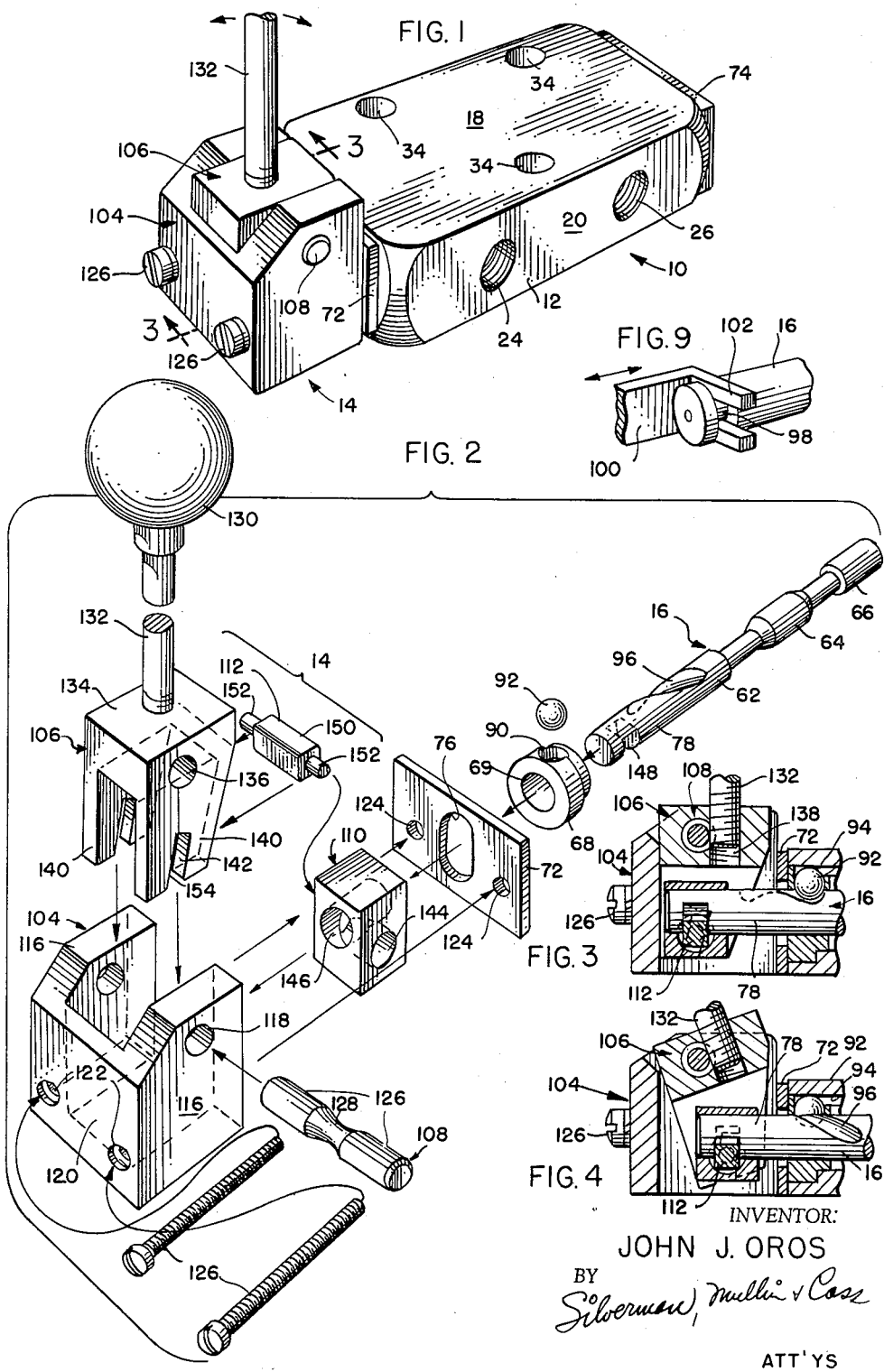

2,965,131

VALVE STRUCTURE AND LINKAGE THEREFOR

John J. Oros, Skokie, Ill., assignor to Air Mite Devices, Inc., Chicago, Ill., a corporation of Illinois Filed June 20, 1958, Ser. No. 743,356

18 Claims. (Cl. 137—622)

This invention relates generally to valve structures and more particularly is concerned with a pneumatic or fluid valve structure and linkage for operating the same.

The particular type of structure with which this invention is concerned is basically derived from the classical D-valve in which there is a reciprocating member which has variations in its diameter along its axial length, and which is reciprocated within a housing or chamber having a system of ports therein adapted to be covered and uncovered in various combinations through this reciprocating movement thereby to control the flow of fluid such as hydraulic oil, air, and the like.

The problems which have beset this art in the past are well-known, and attempts have been made throughout the years to solve them, with varying degrees of success and in most cases with a complete absence thereof. Obviously those skilled in this art have attempted to make the valve structures simple, economical, fool-proof, and so on. The requirements of valves of this type have weighted the scale against the success of attempts to cut down the costs of manufacture and assembly; to make the valve structures easy to assemble and disassemble; to make them operate positively, efficiently and reliably. It might be of value in appreciating the invention herein to point some of these requirements out.

The reciprocating valve having one or more necked down areas along the length of its reciprocating member must be packed well. There can be no leakage between inlet and outlet ports, between the internal chambers and the exterior of the valve body, or between chambers within the structure. The packing is subjected to axial stress during movement of the reciprocating member which tends to distort the packing and force the packing members, generally in the form of annular packing rings, out of their proper positions. Thus the packing members must be firmly and strongly installed within the structure in such a manner as to resist the distorting and displacing forces. In prior structures, complicated arrangements have been used for this purpose. In this invention, as will be seen, the packing members are simple in configuration and are positively positioned within the body of the valve structure with a minimum of complexity making them easy to install or remove.

It is an important object of the invention to provide the novel packing member structures without the use of liners, complicating grooving and undercutting which have the advantages of simplicity, economy, durability, ease of installation and removal and positive operation.

The need for the packing members and their supporting means as well as the complicated system which have characterized the prior art have resulted in multiple part structures, that is, structures which require more than the two basic parts—reciprocating member and housing. Furthermore, even where there are only two parts, these must be shaped in manners which render them difficult to form and assemble and consequently expensive to manufacture. The basic valve structure of the invention herein, because of certain novel aspects of construction has only two parts, a simple reciprocating member with necked down portions, and a simple housing in the form of an integral metal block having the ports formed therein.

Accordingly, it is another important object of the invention to provide the simple basic valve structure above described, and in addition to provide a valve structure in which the housing is formed of an integral block having a single passageway of uniform diameter formed therein and provided along its length with a plurality of small, easily formed annular grooves for seating retainer rings to hold the packing members in position.

Continuing with the discussion of the problems of fluid valves of the reciprocating type, a well-packed structure in which the valve is intended to operate on air, for example, will have the packing members engage the reciprocating members tightly. It therefore requires considerable force to cause reciprocation of the sliding member. In prior structures this problem has not been completely solved, so far as known. One of the most important objects of this invention is to provide structure in which this problem is solved, not only completely, but in a most unobvious and simple manner. Means are provided so that when the slider or reciprocating member is moved axially, it is simultaneously twisted through a novel cam arrangement, so that in effect the wider portions of the sliding member are "screwed" into the packing, which readily accepts them because of the decreased frictional resistance to entry of the wide portion.

Other objects of the invention relating to the twisting movement applied to the reciprocating member are concerned with the provision of a novel camming structure which is internal of the valve structure; which occupies very little space; which is practically frictionless; which is quite economical.

Another problem encountered because of the need for applying considerable force in moving the reciprocable member has been concerned with the provision of an efficient linkage. This invention provides such a linkage, which is assembled without difficulty, which gives a substantial stroke with little driving movement, which works in conjunction with the twisting reciprocable member so that the rotation of the member while moving axially is permitted. The invention contemplates that the linkage is adapted to many different forms of driving the linkage.

The description of the invention which follows will suggest many other objects and advantages of the invention to those skilled in this art, and hence the enumeration of the problems which have been solved by the invention will not be further expanded, but instead will occur to the artisan through the description which follows. This description is a complete detailed explanation of the construction and operation of a preferred form of the invention, which should be considered in connection with the drawings which illustrate the preferred embodiment.

It will be appreciated that the illustrated embodiment is merely an example, and hence the invention may be embodied in forms which vary therefrom in considerable detail. For example, variation in the number of ports, the shape, size and location thereof; in the shape and configuration of the housing as well as the proportions of the same; in the packing parts and members; in the structure of the reciprocating member; in the means for imparting a twist thereto; and in many other phases of the structure are all contemplated as being within the scope of the invention. The illustrated embodiment, while believed to be the best manner of applying the invention to a practical device, is a preferred form, and may not necessarily be the best for all applications, and hence should in no way be considered a limitation on the invention as defined in the claims.

In the drawings:

Fig. 1 is a perspective view of a valve structure constructed in accordance with the invention, having the new linkage associated therewith.

Fig. 2 is an exploded perspective view of the moving parts of the same, the housing or body not being here shown.

Figs. 3 and 4 are sectional views through the left hand end of the moving parts including the linkage, as shown in Figs. 1 and 2 in two different positions of use, both being taken generally along the line 3—3 of Fig. 1 and in the indicated direction.

Figs. 5 and 6 are identical sectional views taken through a horizontal median plane of the structure (as viewed in Fig. 1) but showing the reciprocating member or valve plunger as it is known, in two different positions.

Fig. 7 is a fragmentary sectional view taken generally along the line 7—7 of Fig. 5 and in the indicated direction to show the construction of the means for twisting the valve plunger during operation thereof.

Fig. 8 is an exploded perspective view of one packing ring assemblage to show the arrangement of the parts thereof.

Fig. 9 is a fragmentary perspective view of a modified form of valve plunger and connection with an actuating device.

Prior to entering upon the detailed explanation and description of the structure which is illustrated in the drawings and which embodies the invention, it would be well to discuss the general use of the valve structure as contemplated by the invention herein. Basically the valve structure controls the flow of a fluid, usually air or hydraulic oil, but not excluding water, or other liquids or gases. Such control is not necessarily the control of flow for any metering purpose, but is for the application of the flow of the fluid to the performance of work. Primarily this application is represented by a cylinder of any well-known form which admits the fluid behind a piston, thereby actuating the piston and reciprocating a linkage to which the piston is connected. The principal forms of such cylinders in industry today are air and hydraulic cylinders.

There are also various structures of cylinders, which have different applications. For example, there are double-acting cylinders which are required to apply force in both moving directions of the piston, single acting cylinders in which force need be applied in only one direction of movement of the piston, and various other arrangements requiring the power to be applied and retained on one stroke, the pressure from the main line to be shut on and off quickly or in combination with various functions.

Thus, there are five-way valves, four-way valves, three-way valves and two-way valves, the invention herein being applicable to all of these although illustrated in connection with a four-way valve only. The particular structure which is illustrated has one inlet port and two exhaust ports, while the fluid passageway ports leading to the actuated cylinder are two in number. Through the manipulation of the valve plunger, the flow of fluid through the cylinder is reversed.

The valve structure of the invention may be actuated in a variety of different manners, that is to say—its plunger may be moved by many different means. In the structure illustrated, a novel linkage is associated with the plunger and a manually operable lever is connected with the linkage which may be termed an actuating device. In addition to manual operation, the structure which is illustrated can be adapted for treadle operation or power operation. The plunger of the valve structure likewise can be connected to electrically energized solenoids, and so-called pilot actuators which are small fluid-operated cylinders. Spring returns can be applied, or double actuation can be built into the structure, such as for example by connecting a solenoid at opposite ends or through equivalent duplicating actuating means.

The invention, therefore, although illustrated as a four-way, manually operated valve structure, is readily applicable to any of the arrangements mentioned, and to a variety of others. It is an important characteristic of the invention that its benefits are universally available to many different applications.

Basically the structure of the invention comprises a body or housing which is extremely simple in this case because of the nature of the invention, and hence is formed of a solid block of metal suitably bored and tapped, as required. Conceivably it could be made of several pieces of metal held together by clamps or bolts or the like, and these could be cast or forged, but it has been found that for great simpliicty the block can be an integral member, of aluminum, for example, with the necessary recesses and ports formed as required. Aluminum is ideal because it is light, readily worked, and can be anodized different colors for coding the characteristics of the valve.

The valve structure is designated generally by the reference character 10 which includes the mechanism contained within the rectangular block 12 but does not include the actuating mechanism which is designated generally 14 and is connected with the valve structure 10 at the left hand end as viewed in Fig. 1. This will be considered the front end, for convenience of description only.

The block 12 forms the body or housing within which the plunger 16 (see Fig. 2) reciprocates and hence will be referred to as a housing, since the valving action is caused by cooperation between the plunger 16 and the housing 12. The housing is generally rectangular in cross section on a horizontal plane, with the surface 18 considered the top, and is substantially lesser in vertical thickness than in width in the horizontal plane. The corners are rounded, but this, as well as the exact configuration, are matters of design choice.

The elongate sides of the housing 12 are 20 and 22 which may be considered the chamber side and source side respectively. These designations are also merely for convenience, and not intended as limitations. The chamber side has two ports 24 and 26 which lead by suitable conduits (not shown) to the chambers of the device which is to be actuated by the fluid controlled by the structure 10. These could be, for example, the opposite ends of a hydraulic or pneumatic cylinder. The source side 22 has three ports, 28, 30 and 32, the port 30 being adapted for connection to a supply line of fluid and comprising an inlet, and the ports 28 and 32 being exhaust ports for the valve structure, leading to sump or atmosphere, depending upon the kind of fluid.

There are holes bored vertically through the body as shown at 34 by means of which bolts may be used to secure the valve structure 10 to a piece of apparatus or the like. Obviously the bolt holes should be provided where they will not interfere with the ports or internal chambers of the housing 12. This is best seen in Figs. 5 and 6.

The plunger 16 is adapted to reciprocate within an elongate passageway 36 which is formed in the housing 12 throughout its entire length. This passageway 36 is of substantially uniform cylindrical configuration throughout except for enlarged ends 38 and 40 left and right respectively. Each of the ports above described makes communication with the passageway 36 by suitable conduits which intersect the passageway. Thus, the axes of the conduits connecting the ports with the passageway 36 and the axis of the passageway 36 itself all lie in substantially the same plane for a compact structure. Obviously variation is possible. In referring to ports hereinafter, the entire recess including conduit from the respective side of the housing 12 to the passageway 36 will be considered the port. Suitable tapered threads, or any other means for providing a union or pressure connection with the conduits leading fluid externally of the valve structure or to it may be used.

There are four packing assemblages which are positioned in the passageway 36, and these are designated, starting from the left, 44, 46, 48 and 50. The axial positions of these assemblages is of importance to the operation of the valve structure 10, but are well-known and understood. The two assemblages 44 and 46 are located between the two ports 28 and 30, but must be separated sufficiently so that the assemblage 44 is located between the ports 24 and 28, while the assemblage 46 must be located between the ports 24 and 30. Similarly the assemblages 48 and 50 are between ports 30 and 32 but separated to have the port 26 open into the passageway 36 between them.

Each of the assemblages is formed of the same number of identical parts similarly disposed, and hence the description of one will suffice. The assemblage is shown in exploded view in Fig. 8 and this may be considered assemblage 48, for example which is shown partially in section in Fig. 5. The packing member itself is an annular member 52 of rubber-like material, such as neoprene, or some inert flexible plastic which fits tightly in the passageway 36. Its outer circumference is axially tapered, with the lesser diameter end of the taper being to the right in assemblages 48 and 50, and to the left in assemblages 44 and 46. The face of the ring 52 is provided with an annular groove 54 of substantially V-shaped configuration, which causes the ring to at least partially expand against its confining surfaces—the passageway 36 and plunger 16—when pressure is applied from the open face. Thus, the grooved faces of the packing members of the respective assemblages all face inwardly relative the center of the housing. The two left hand members face the right, and the two right hand packing members face the left.

The assemblage 48 also includes a pair of flat washers 56 on opposite sides of the ring 52, the outer diameter of the washers being slightly less than the diameter of the passageway 36 to permit them to easily move through the passageway 36 and be readily positioned. The inner diameter of the washers is somewhat less than the inner diameter of the groove 54 so that fluid can readily enter the groove 54 past the washer which engages that face of the packing ring 52. The split resilient retainer rings 58 on opposite sides of the washers 56 complete the assemblage 48. The axial dimension of each assemblage is defined by the position of its rings 58, which prevent any axial distortion or displacement of the packing member. A pair of shallow annular grooves 60 is cut in the wall of the recess 36 at the desired position of each assemblage. The split rings are readily contracted through the use of suitable tools, inserted into the passageway from either end thereof and permitted to expand and snap into their respective grooves 60. Obviously it is more convenient to start at the center and work outwardly, inserting the parts of the assemblages in proper consecutive order.

It will be appreciated that the construction described is extremely simple and requires no complex formations of chambers within the passageway, no liners, no involved apparatus for installing the packing assemblages. The rings 58 firmly hold the packing rings 52 in the precise position where desired. Any and all of the parts of the assemblages are readily removed or replaced. Retainer rings of construction other than shown for rings 58 would be practicable.

Attention is now invited to the plunger 16 which cooperates with the packing members to provide the desired valving action. The plunger has three parts 62, 64 and 66 which are of a diameter slightly less than the inside diameter of the packing rings 52 so that these three parts will tightly fit in the rings 52. The parts 62, 64 and 66 are separated by necked or lesser diameter portions 63 and 65, the junctions between portions being tapered and rounded to prevent damage to the rings during movement of the plunger. Each of the end portions 62 and 66 is mounted for reciprocation in suitable bearings 68 and 70 held in place in the enlarged ends 38 and 40 respectively by suitable bearing plates 72 and 74 respectively. The bearing plate 72 on the front end of the valve structure 10 has an opening 76 through which the left hand end 78 of the plunger may extend to enable the same to be connected to any manner of actuating device such as for example that shown at 14.

The general operation of the valve structure 10 will now be explained. Presume that the plunger 16 has been moved to the right, that is toward the rear of the passageway 36 as shown in Fig. 5. The packing member 52 of the assemblage 44 is disposed upon the end of the portion 62 and hence no fluid can pass from the passageway 36 to the port 28. The assemblage 46 is axially aligned with the necked portion 63 establishing communication between the inlet port 30 and the port 24 by way of the passageway 36, past the ring of the assemblage 46. The ring 52 of the assemblage 48 is aligned with and tightly seizes the wide diameter portion 64 and hence the path of fluid between the port 30 and the port 28 is confined. As a matter of fact the pressure of fluid in the path defined by the arrows 80 serves to expand the rings of the assemblages 44 and 48 to make them engage the more tighter in the passageway 36 and upon their respective wide diameter portions 62 and 64.

The assemblage 50 is aligned with the necked portion 65 and hence the fluid from the port 26 can freely pass out of the exhaust port 32 by the path of the arrows 82.

Presume now that the plunger 16 is moved to the left as shown in Fig. 6. The movement changes the alignment of the various parts of the plunger with the assemblages 44, 46, 48 and 50 (which remain fixed, of course) and hence an entirely different condition of flow results. Here the inlet port 30 communicates with the port 26 by the path 84 while the exhaust port 32 is blocked off. The exhaust port 28 now communicates with the port 24 of the chamber side 22 by the path 86.

The flow conditions can thus be changed at will merely by moving the plunger right or left.

The general arrangement of flow change is well-known, and is not claimed per se as the invention herein.

An important feature of the invention will now be described. In moving the plunger 16 from right to left and vice versa, it is necessary to slide the wider portions 62, 64, and 66 relative to the tightly seizing packing rings 53. Considerable friction must be overcome, and this is especially true where a wide portion must be initially moved into a ring. Thus, in moving the plunger 16 to the left, the wider diameter portion 64 must enter the ring 52 of the assemblage 46, expand the opening in the center of the packing ring and have the same ride a substantial distance along the said portion 64. This occurs simultaneously that the portion 66 enters the ring 52 of the assemblage 50. To insure efficient valve action, the packing rings must be tight, and hence the force required to move the plunger is substantial.

It is highly desirable that this force be very little, especially where such valves are to be remotely controlled, as for example, by low-current solenoids or the like.

It has been discovered that if the valve plunger is slightly twisted or rotated axially, simultaneously that it is being reciprocated, the result will be that the wider portions will more readily engage into the packing rings and move along the same with less friction. This phenomena is effective because the result is that a sort of "screwing" action occurs and the friction is very substantially reduced. Less power is required to move the plunger and the action is hence easier. It is also obvious that the packing members will last longer since stress applied to them is more circumferential along which dimension they have more resilience and hence more flexibility, than when the stress is in axial direction as conventional.

In order to accomplish the slight helical movement simultaneously with the reciprocating movement, any suitable means may be connected with the plunger, such as a slot and pin connection, cams, gears, or other means within or without the housing 12, but the structure specifically described and illustrated herein is preferred. This means is desirable because of its great simplicity, economy and effectiveness. It comprises a form of cam and follower means in which the cam is a shallow helical concave groove and the follower is a ball.

Specifically, the bearing 68 has a spherical seat 90 formed therein in which there is disposed a hardened steel ball 92. The ball 92 extends radially outward of the bearing a small amount so that it engages in a slot 94 provided in the housing 12 adjacent the enlarged is disposed. This prevents the ball and bearing from portion 38 of the passageway 36 in which the bearing 68 rotating relative to the housing. Only a very small segment of the ball 92 extends into the bore 69 of the bearing 68 and this segment engages a concave helical groove 96 which is formed in the wider diameter portion 62 of the plunger 16. The bottom of the groove 96 is of substantially the same curvature as that of the ball, except that the configuration of the groove is uniform along its length. As the plunger 16 is reciprocated one direction or the other, the ball 92, being fixed relative to the housing but engaged in the helical groove 96, will not permit the plunger to slide axially unless the plunger simultaneously rotates to enable the ball to follow the helical groove. The ball 92 will readily roll along the groove 96 but exert the camming action which will twist the plunger.

The length of the groove 96 must be at least the length of the stroke of the plunger 16, but it can be somewhat longer, for ease of operation. If desired, one or both ends of the groove may be used as stop means for the movement of the plunger. The rotation of the plunger 16 need only be a few degrees to give the desired results, i.e., the easing of friction to enable less force to be applied in moving the plunger. Less than a quarter of a turn, that is, less than 90° of rotation has been found satisfactory, but the invention is not limited to this amount of rotation for the stroke.

The preferred form of the means for imparting a slight rotation to the plunger 16 is the ball and groove arrangement described because the pressure between the cam means (the groove) and the follower (the ball) is to a gerat extent relieved by the rolling of the ball. Other means will produce similar results. For example, a pin can be placed on the plunger 16 extending into a helical groove in the bearing 68 or in a bushing fixed relative to the housing. Other combinations of cam and follower structure will occur to the skilled artisan once taught the basic arrangement. The invention contemplates all of these.

The construction described is substantially wholly within the valve structure 10 and hence is free from dust or dirt, and does not in any way interfere with actuating mechanism problems. The ball and groove arrangement could as easily be provided external of the housing 12.

In any valve structure constructed according to the invention herein, which utilizes the twisting simultaneously with reciprocation of the plunger 16, the only requirement must be that the actuating means must provide a coupling with the end 78 of the plunger 16 which will permit the slight rotation of the plunger while it is being reciprocated. A simple example is shown in Fig. 9 in which the plunger end has an annular groove 98 formed in its external end, and the actuating means includes a link 100 which is adapted to move along the axis of the plunger and also has a right angle bent bifurcated end 102 which engages in the groove 98. Any other simple structure could be used.

In the actuating means 14 a somewhat different coupling arrangement is used as will be seen hereinafter.

The actuating means 14 includes structure which enables the operator of the apparatus to move the plunger axially in the housing 12 while permitting the limited rotation of the plunger 16 in one rotative direction while moving toward the rear of the housing, and in an opposite direction while moving toward the front of the housing 12. The parts of the mechanism 14 are: a member 104 of substantially U-shaped cross section which provides the fulcrum for the actuator 106, the latter being another part of the mechanism, a pin 108 upon which the actuator is journalled, a retainer 110 which provides a coupling for the free end 78 of the plunger and the actuator pin 112, this latter pin being connected to move with rocking movement of the actuator 106. These will be described in detail hereinafter.

The member 104 described above of substantially U-shaped cross section may be considered an adapter since it enables the particular manner of reciprocating the plunger 16 to be adapted for use with the construction 10. As stated, it is U-shaped in cross-section, with the U arranged on its side, thereby providing a pair of upstanding walls 116 each having an aligned journal opening 118 of suitable diameter to slidably receive the pin 108. The walls 116 are maintained in spaced relation by the connecting wall 120. A pair of holes 122 are drilled through the adapter 104 in the side walls 116 thereof in alignment with similarly positioned holes 124 in the bearing plate 72 for receiving long screw-threaded bolts 126 adapted to engage tapped holes in the front end of the housing 12 to enable the mechanism 14 to be tightly engaged to the front end of the housing 12.

It will be seen that the pin 108 has journal ends 126 and a central reduced diameter portion 128. As seen in Figs. 3 and 4, a handle 130 with a depending rod 132 is adapted to be screw-threadedly engaged with the top of the actuator 106. The actuator 106 is a block-like member having a horizontal plate-like portion 134 with a horizontal bearing hole 136 passing through the same. The width of the top portion 134 is less than the distance between the walls 116 so that the entire actuator can readily rock between these walls. The pin 108 passes through the aligned holes 118 and 136. When in assembled condition, the vertical threaded hole 138 intersects the horizontal bearing hole 136 by an amount slightly less than the depth of the groove defining the narrowed portion 128. When the bottom end of the rod 132 is screwed into place, it engages in the necked portion 128 as shown in Figs. 3 and 4 and prevents withdrawal of the pin 108. Since this must be done to disassemble the actuating means 14, the entire structure is locked in assembly by this simple and effective means, which automatically occurs when one secures the handle rod 132 in place. The hole 138 may be one of several by means of which a treadle or other link or driving member may be secured to the actuator 106.

The actuator 106 has a pair of opposite side walls 140 each of which has a slot 142 formed opening to the bottom edge thereof. Disposed between the walls 140 is the retainer 110 which is in the form of a rectangular block having one passage 144 passing through the same horizontally between opposite walls, and another passageway 146 at right angle thereto, intersecting the same but having its axis spaced above the passageway 144. The passageway 146 receives the free end 78 of the plunger with the notch 148 formed on the end of the plunger 16 aligned with the passageway 144. The pin 112 connects the plunger end 78 to the retainer 110. Its body is generally square in cross section, to engage with the notch 148, with the length of this square cross section part 150 the same or slightly less than the side to side width of the retainer block 110 so that the reduced diameter pin ends 152 will protrude from the retainer block when in assembled condition. These pin ends 152 engage in the slots 142.

When assembled as described, rocking of the handle 130 to swing the actuator 106 about its pin 108 will reciprocate the plunger 16 right and left as shown in Figs. 3 and 4. During this movement the pin ends 152 will slide up and down the slots 142, and it will be obvious that these slots should be of a configuration to permit the described movement. The exact shape of the slots can be ascertained by developing the intersection of a point moving in a horizontal line spaced from the fixed axis of the pin 108 with a radius rotating about said fixed axis. Since the amount of movement is not very great and the connection can be fairly loose, compromises can be made without in any way affecting the operation of the structure. For example, in one commercial embodiment the slot 142 was rectilinear throughout and arranged at an angle of approximately 10° with the vertical, and one edge thereof, namely the edge 154 in Fig. 2 intersected the axis of the pin 108.

The movement of the handle 130, while causing the reciprocatory movement of the plunger 16, will also cause the twisting or slight rotative movement of the plunger 16 due to the ball 92 and the groove 96 cooperating in the manner previously described. The connection or coupling of the end 78 with the retainer 110 must therefor also permit of such limited rotative movement. In the structure described this is provided by making the notch 148 substantially deeper than the extent of intersection of the end 78 with the pin 112 so that the plunger 16 may readily twist as much as 90° without interference with the pin 112.

While the manner of assembling and disassembling the actuating mechanism 14 should be ascertainable from the above description, a short explanation will help emphasize the simplicity and effectiveness of the structure. As a further demonstration of the great simplicity and economy of the structure 10 the assembly of the valve structure itself will also be described.

The blocks 12 are readily machined and the grooves 60 are cut by any suitable means within the passageway 36. In the four-way valve illustrated there are eight of these. Thereafter the assemblages 44, 46, 48 and 50 are installed in position. Easily built jigs as well as known tools may be used. For example, the commercially available rings with the enlarged perforated ends may be installed with special pin-ended pliers furnished by the manufacturer, or similar tools may be made which will enable the split rings to be contracted and released at any desired axial positions within passageway 36. Preferably the rings are released just short of their grooves and thereafter pushed into place by flat-ended rods so that their snapping into position is readily heard by the assembler.

With all of the packing assemblages in place, the end bearing 70 may be dropped into the enlarged end 40 and fastened in place by the bearing plate 74. This is done by driving screws through the plate 74 into the back end of the housing 12.

The plunger 16 is now partially inserted into the passageway 36 from the front end thereof. The bearing 68 is slipped over the end and moved axially until the spherical ball seat is aligned with the groove 96. The ball 92 is then placed in the seat, which may be of such dimensions as to enable the ball to snap in place past the resilient lips of the seat. The plunger and assembled bearing 68 are then inserted completely into the passageway 36 until the bearing 68 seats in its enlarged recess 38 with the free end 78 of the plunger 16 protruding from the bearing 68 and the ball located in recess 94.

The bearing retainer plate 72 is then engaged over the end 78 of the plunger and may be fastened in place, if provision for independent fastening thereof is provided. Otherwise, as here, the actuating means 14 is assembled to the shaft with the plate 72 loosely disposed thereon also. First the retainer 110 is engaged on the end 78 so that the end 78 passes through the bore 146 until its notch 148, facing downward is aligned with the transverse passageway 144. The pin 112 is then slipped into the passageway 144 engaging the notch 148 and the retainer is inserted into the actuator 106 between the walls thereof so that the reduced diameter protruding pins 152 of the pin 150 are disposed in the slots 142. The adapter member 104 is next slipped over the actuator 106 and after the openings 136 and 118 are aligned, the pin 108 pushed home. The screws 126 are then engaged in the openings 122 and screwed into the front end of the housing 12 through the plate 72. Following this, the handle rod 132 is screwed home and the assembly is complete.

It is believed that the invention should be understood and appreciated in all of its many facets, and it is again pointed out that this type of construction is readily adapted to many different kinds of applications. Furthermore, the invention is also applicable to many different kinds of structures. Consider for example the novel means for applying limited rotative movement relative to the housing, that is relative to the passageway 36. It is preferred to form the valving chambers by necking the plunger and having the passageway uniform in diameter throughout and fixing the packing means in the passageway. Certain phases of the invention are concerned with this and hence claim the same. However, the benefits of the rotative plunger will be available to a structure in which the packing means are carried by the plunger and moved along the passageway, the valving chambers being formed in the passageway through changes in the diameter thereof. The problem of overcoming friction is present in such structures as well, as the packing members ride from unconfined to confined condition along the passageway. Likewise combinations of the two types of structures can use the feature of the invention to advantage.

Another variation which is included within the scope of the invention is one in which a rotating action is applied to the end 78 of the plunger 16 by the actuating means. This will obviously translate the plunger 16 axially while at the same time rotating the same, because of the ball and groove structure. Under these circumstances, the pitch of the groove 96 should be less than it is in the cases described above to prevent possible binding. Thus during the length of stroke, the plunger may be required to turn substantially 90° or more. The coupling between the actuating means and the plunger end 78 must permit axial movement. A sliding spline gear, sheave or crank arm would meet this requirement, as examples.

Accordingly the invention should not be interpreted as limited to anything specifically shown herein, but should be understood as encompassing the full range of equivalents to which the inventor is entitled in view of the prior art. all as stated in the appended claims.

What is claimed by Letters Patent of the United States is:

1. A fluid valve structure comprising a housing having a passageay therein, port means communicating with said passageway, a plunger reciprocable in said passageway, packing means cooperating with said passageway and plunger to establish selected communication paths through said passageway between said port means upon reciprocating movement of said plunger relative to said passageway, said plunger and passageway having cooperative formations to provide chambers for said paths in said passageway during said reciprocating movement, and a cooperating coupling between said housing and plunger so arranged that the said reciprocating movement of said plunger causes at least partial rotation of said plunger during said reciprocating movement substantially simultaneously therewith for decreasing frictional resistance by said packing means to relative movement between said plunger and passageway.

2. A fluid valve structure comprising a housing having a passageway therein, port means communicating with said passageway, a plunger reciprocable in said passageway, packing means cooperating with said passageway and plunger to establish selected communication paths through said passageway between said port means upon reciprocating movement of said plunger relative to said passageway, said plunger and passageway having cooperative formations to provide chambers for said paths in said passageway during said reciprocating movement, and means for causing at least partial rotation of said plunger during said reciprocating movement substantially simultaneously therewith for decreasing frictional resistance by said packing means to relative movement between said plunger and passageway, said means for causing rotation of the said plunger comprising cam and follower means coupled between said plunger and housing.

3. A fluid valve structure comprising a housing having a passageway therein, port means communicating with said passageway, a plunger reciprocable in said passageway, packing means cooperating with said passageway and plunger to establish selected communication paths through said passageway between said port means upon reciprocating movement of said plunger relative to said passageway, said plunger and passageway having cooperative formations to provide chambers for said paths in said passageway during said reciprocating movement, and means for causing at least partial rotation of said plunger during said reciprocating movement substantially simultaneously therewith for decreasing frictional resistance by said packing means to relative movement between said plunger and passageway, said means for causing rotation of said plunger comprising a projection carried by said housing and a helical groove in said plunger, the projection being engaged in the groove.

4. A fluid valve structure comprising a housing having a passageway therein, port means communicating with said passageway, a plunger reciprocable in said passageway, packing means cooperating with said passageway and plunger to establish selected communication paths through said passageway between said port means upon reciprocating movement of said plunger relative to said passageway, said plunger and passageway having cooperative formations to provide chambers for said paths in said passageway during said reciprocating movement, and means for causing at least partial rotation of said plunger during said reciprocating movement substantially simultaneously therewith for decreasing frictional resistance by said packing means to relative movement between said plunger and passageway, said means for causing rotation of said plunger comprising a ball mounted on said housing and rotatable only about its centre, a concave helical groove on said plunger having the ball engaged therein, and the axial length of said groove along the plunger being at least the length of the stroke of said plunger during its reciprocating movement.

5. A fluid valve structure as claimed in claim 1 in which said passageway is of substantially uniform diameter and said formations include at least one necked portion provided on said plunger having wider diameter portions on opposite axial ends thereof, said packing means comprising resilient rings fixed in said passageway, said wider diameter portions adapted tightly to engage said rings during reciprocating movement of said plunger.

6. A fluid valve structure as claimed in claim 1 in which means are provided external of said housing for actuating the plunger in its reciprocating movement.

7. In a valve structure in which there is a housing and a plunger reciprocable in said housing, means for reciprocating said plunger which comprises an adapter fixed relative to said housing, a rockable member journalled in said adapter, coupling means in the housing mounted on the end of said plunger, and a slot and pin connection between said rockable member and said coupling whereby rocking movement of said rockable member will be changed to rectilinear movement of said coupling means along the axis of the said plunger.

8. A structure as claimed in claim 7 in which the axis of the rockable member is spaced substantially from the axis of said plunger and is at right angle thereto.

9. A structure as claimed in claim 7 in which said coupling means is operably connected to cause at least partial rotation of said plunger during reciprocating movement thereof.

10. A structure as claimed in claim 7 in which said coupling means comprises a block member having the end of said plunger journalled therein, a pin transverse of the block member and engaged with said plunger end to prevent axial movement of said plunger end relative to said block member, said rocking member having a slot therein engaged by said pin to provide said slot and pin connection.

11. A structure as claimed in claim 10 in which the end of said plunger has a notch and the said pin is engaged in said notch within said block member but said notch is of depth sufficient to continue to be engaged with said pin while the plunger rotates a limited extent during its reciprocating movement.

12. In a valve structure which includes a housing having a central passageway therein, a plunger mounted in said passageway for reciprocating movement therein, packing means between the plunger and passageway, ports communicating with the passageway, chambers formed between the plunger and passageway and cooperating with the packing means to provide selective valve action between ports during reciprocating movement of said plunger, and means for driving the plunger in reciprocating movement; means for causing rotative movement of the plunger during its reciprocation which comprises a ball rotatively mounted at a fixed point of said housing adjacent the passageway, a helical groove provided in said plunger opposite said ball and with the ball engaging the said groove.

13. A structure as claimed in claim 12 in which the driving means is coupled with said plunger in a coupling permitting rotative movement of said plunger during reciprocation thereof.

14. In a valve structure which includes a housing having a central passageway therein, a plunger mounted in said passageway for reciprocating movement therein, packing means between the plunger and passageway, ports communicating with the passageway, chambers formed between the plunger and passageway and cooperating with the packing means to provide selective valve action between ports during reciprocating movement of said plunger, and means for driving the plunger in said reciprocating movement; means for causing twisting of the plunger during its reciprocation which comprises: a bushing non-rotatively secured in said passageway at one end thereof and having a bore slidably receiving a portion of said plunger therein, a ball socket in said bushing, a ball in the socket and having a portion thereof protruding into said bore, a helical groove in said plunger portion and the ball being engaged therein.

15. A fluid valve structure comprising, a housing having an axial passageway therein and port means communicating with said passageway, a plunger reciprocably mounted in the passageway, packing means cooperating with the passageway and plunger to establish selected communication paths through said passageway between said port means upon reciprocating axial movement of the plunger relative the passageway, said plunger and passageway having cooperating formations to provide chambers for said paths in said passageway during said reciprocating movement, and coupling means on the interior of the housing enabling mounting the plunger in said passageway to affect rotation of the plunger substantially simultaneously with said reciprocating axial movement thereof so as to facilitate engagement of the plunger with said packing means.

16. A valve structure as described in claim 15 in which last mentioned means comprises a cooperative coupling between the housing and plunger.

17. A valve structure as described in claim 16 in which said cooperative coupling provides partial rotation of said plunger during said reciprocating movement in one direction.

18. A valve structure as described in claim 15 in which last mentioned means comprises a cooperative coupling between the housing and plunger, comprising cam and follower means.

References Cited in the file of this patent

UNITED STATES PATENTS

| | | |
|---|---|---|
| 625,767 | Hitchcock | May 30, 1899 |
| 1,032,470 | Denneen et al. | July 16, 1912 |
| 1,091,552 | Westerberg | Mar. 31, 1914 |
| 1,213,590 | Compton | Jan. 23, 1917 |
| 1,359,785 | Bird | Nov. 23, 1920 |
| 1,922,834 | Albright | Aug. 15, 1933 |
| 1,958,303 | Hayes | May 8, 1934 |
| 1,967,851 | Wilson | July 24, 1934 |
| 2,653,580 | Moore | Sept. 29, 1953 |
| 2,700,307 | Thoresen | Jan. 25, 1955 |
| 2,747,611 | Hewitt | May 29, 1956 |
| 2,826,258 | Livers | Mar. 11, 1958 |

FOREIGN PATENTS

| | | |
|---|---|---|
| 635,237 | Great Britain | Apr. 5, 1950 |
| 1,105,326 | France | Nov. 29, 1955 |